(12) United States Patent
Akiti

(10) Patent No.: US 7,421,662 B1
(45) Date of Patent: Sep. 2, 2008

(54) AUTOMATING INTERACTION WITH A HOST COMPUTING DEVICE

(75) Inventor: Tetteh Akiti, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 367 days.

(21) Appl. No.: 11/247,394

(22) Filed: Oct. 11, 2005

(51) Int. Cl.
*G06F 13/00* (2006.01)
*G06F 15/00* (2006.01)

(52) U.S. Cl. ........................ 715/764; 715/780
(58) Field of Classification Search ................ 715/503, 715/763, 764, 780, 853, 854; 709/203, 219
See application file for complete search history.

(56) References Cited

U.S. PATENT DOCUMENTS

| 6,199,099 B1 * | 3/2001 | Gershman et al. | 709/203 |
| 6,687,745 B1 * | 2/2004 | Franco et al. | 709/219 |
| 7,278,113 B1 * | 10/2007 | Racine et al. | 715/780 |

* cited by examiner

*Primary Examiner*—Cao "Kevin" Nguyen

(57) ABSTRACT

A system, a method and computer-readable media for automating interaction with a host computer. Input values defining desired interactions with a host computer are received. The input values are utilized to generate computer code for performing the desired interactions, and this code is executed to perform the interactions with the host computer.

20 Claims, 5 Drawing Sheets

AUTOMATING INTERACTION WITH A HOST COMPUTING DEVICE

CROSS-REFERENCE TO RELATED APPLICATIONS

Not applicable.

STATEMENT REGARDING FEDERALLY SPONSORED RESEARCH OR DEVELOPMENT

Not applicable.

FIELD OF INVENTION

The field of the invention generally relates to computer-implemented systems and method for automating communications with an interactive program on a host computer.

BACKGROUND

In recent years, computer users have become more and more reliant upon computers to store and maintain a wide variety of information. Of course, with this rise in computer use, the number of computing devices in operation has also increased significantly. For example, a typical telecommunications network may be comprised of hundreds (if not thousands) of different computing devices.

With so many computing devices in operation, efficiently maintaining and interacting with the large number of computers may invoke various challenges. To interact with a host computer, a user may access a program running on the computer. In general, the program will provide an interface that presents input prompts to which the user will be expected to respond. Through this manual interaction, the user may submit log-on credentials (i.e., name and password), perform desired operations and generate log files. Manual interaction with a program, however, may be time-consuming, inefficient and error prone, especially when similar series of interactions must be repeated on many different host computers.

A variety of techniques exist in the art for mitigating the problems associated with manual interaction with host computers. For example, a computer language named "Expect" may be used to automate interactions with host computers. Expect allows computer users to write computer code that imitates a user's interaction with an interactive program, and then, by executing this code, the interactions may be performed on a host computer without user intervention. By executing script written in the Expect language, a sequence of interactions with an interactive program may be performed. Expect has several commands that are used to control the communication process. For example, the spawn command directs Expect to run an interactive program or process. Additional data may be passed as arguments to the spawn command. These arguments may be passed on to the spawned process. Another command is the expect command. One or more patterns may be passed on in the expect command. This command monitors the output from the spawned process and watches for the pattern or patterns to appear. Once a pattern is identified in the output of the spawned process, additional arguments provide specific actions to execute. If no action is provided, the command pauses the execution of the program until the pattern appears. Those skilled in the art are readily aware of and familiar with the command structure and operation of the Expect language.

Despite the advantages of techniques such as those embodied by Expect, a variety of deficiencies still exist in the art surrounding the automation of interaction with host computers. For one, users of Expect today must understand the Expect language and must draft code for each different series of interactions. For complex interactions, the code may be quite involved. Further, code drafting requires a certain level of expertise and knowledge, and new code always requires testing and debugging. The causal user may not possess the necessary expertise, while even expert users may not have the time to draft and test new code for each interaction. Accordingly, there is a need for improved systems and methods for automating interaction with host computers.

SUMMARY

The present invention meets the above needs and overcomes one or more deficiencies in the prior art by providing systems and methods for automating interaction with a host computer. In one aspect of an embodiment of the present invention, a computer-implemented method is provided. Input values defining desired interactions with a host computer are received. The input values are utilized to generate computer code for performing the desired interactions with the host computer. This code is executed to perform the desired interactions with the host computer.

Another aspect of an embodiment of the present invention includes a system for automating communications with an interactive program on a host computer. The system includes functions for controlling interactions with the interactive program. The functions may control responses to input prompts by the interactive program. A control component is configured to receive input values defining a series of desired interactions with the host computer. These input values may identify one or more functions. A flow component is also included. The flow component may be configured to use the input values to enable execution of the identified functions so as to perform the desired interactions with the host computer.

A further aspect of an embodiment of the present invention includes a computerized method for automating interaction with a host computer. Functions for controlling interactions with the host computer are provided. Input values defining desired interactions with the host computer are received, and a schedule of interactions is generated. Then, the series of desired interactions is performed in accordance with the schedule.

BRIEF DESCRIPTION OF THE SEVERAL VIEWS OF THE DRAWING

The present invention is described in detail below with reference to the attached drawing figures, wherein.

DETAILED DESCRIPTION

Figure 1:
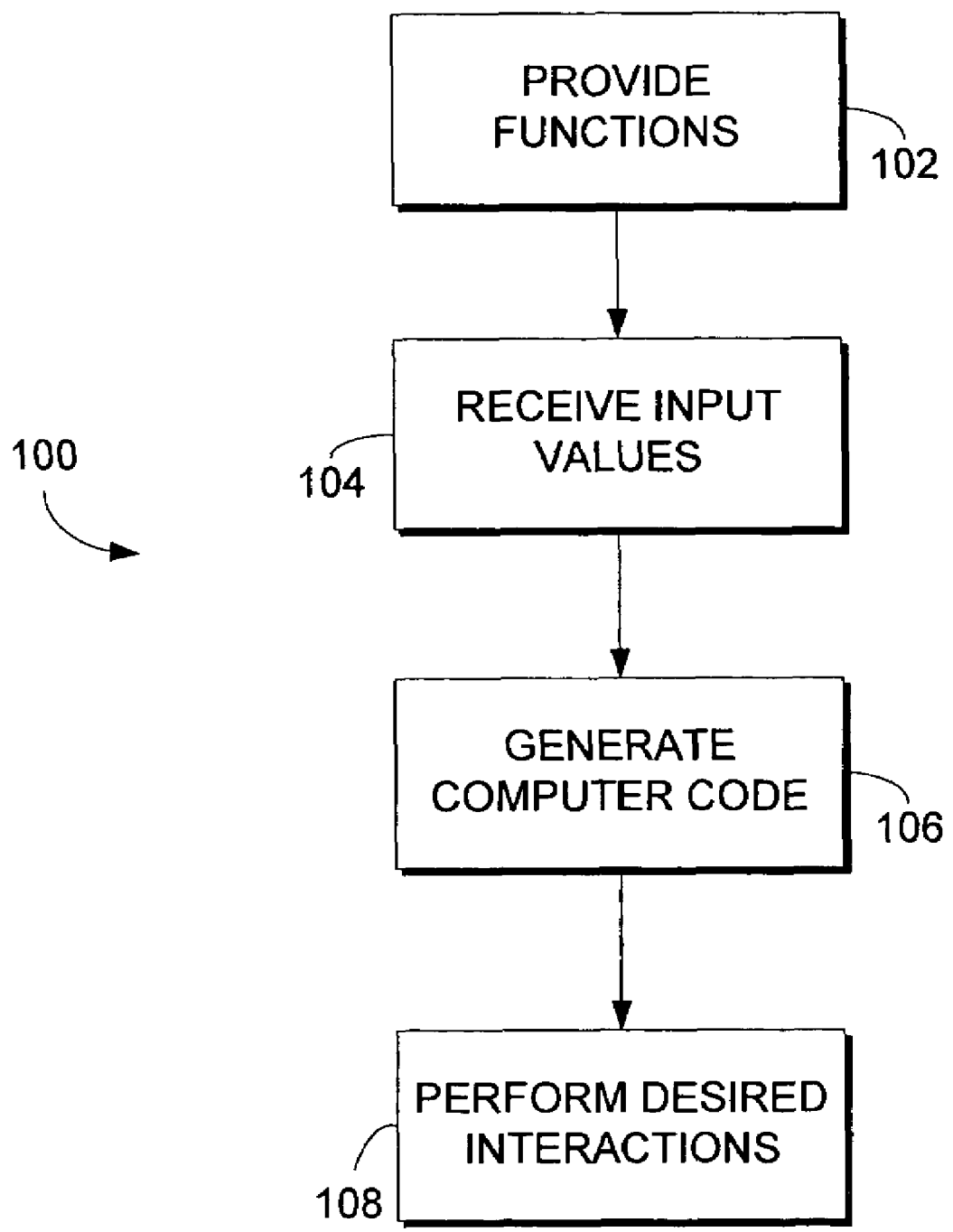
FIG. 1 illustrates a method in accordance with the present invention for controlling interactions with a host computer.

The subject matter of the present invention is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

The present invention provides an improved system and method for automating interaction with a host computer. The invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data. Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

The present invention may be practiced in any number of network environments. Further, the invention may be practiced in a multi-network environment having various, connected public and/or private networks. As will be appreciated by those skilled in the art, computer networks may take several of different forms and may use several different communication protocols.

FIG. 1 illustrates a method 100 for controlling interactions with a host computer. At a step 102, the method 100 provides a plurality of functions. As known in the art, computer code may be divided into modules of code called functions, where each function contains the code required for a certain task. To invoke the function, it may be called and passed any necessary parameters. As will be appreciated by those skilled in the art, functions allow for computer code associated with a function to be re-used throughout a program and in multiple programs.

Any number of functions may be provided by the method 100. In one embodiment, a function library is provided, and the functions may relate to a variety of common tasks associated with interacting with host computers. For example, a function named "openTelnet" may be provided for opening telnet sessions with host computers. This function may require parameters such as the IP address of the host computer, the user name of the entity seeking access, a password to the host computer and a value to identify the session. For example, the function call "openTelnet(10.77.86.231; user1; password; 1)" may open a telnet session on a host computer with the IP address 10.77.86.231. The user name "user1" and password may be used to login, and the session may be identified as session 1. A command "closeTelnet" may be used to close the session. Further, the similar commands "openFTP" and "close FTP" may also be provided to open and close FTP sessions with host computers. It is important to note that without a function, lengthy computer code may be required to describe these operations. However, with the use of a function such as openTelnet, the user may describe desired telnet processes by identifying the openTelnet function along with its parameters.

At a step 104, the method 100 receives input values defining desired interactions with a host computer. A host computer may include an interactive program that provides an interface having input prompts to which responses or commands are expected. Instead of manually accessing this interface, a user may desire an automated interaction, and the user may describe the interaction with the input values. For example, the user may desire to open an FTP session on the host computer. To open such a session, the interface may prompt the user for information such as the IP address of the remote computer and a user name and password to logon to the computer. Thus, the input values may identify the function openFTP, along with the parameters of an IP address, user name and password. As another example, the user may desire to run a command or a script on the remote computer. Functions titled runCmd and runScript may allow for this interaction, and these functions may have a parameter that identifies the name or location of the command/script. Accordingly, the input values may define any number of interactions with the host computer, and the input values may be purely data-driven (i.e., including only function calls with parameters). As will be appreciated by those skilled in the art, this function-based approach will reduce redundancy and duplication when creating scripts for automated interactions.

The method 100, at a step 106, utilizes the input values to generate computer code that may be executed to perform the desired interactions. This computer code may be considered an executable script, and any computer code used to perform the desired interactions may be considered part of the executable script. It is important to note that the computer code may be completed before any interactions are attempted or may be generated as portions of the script are being executed. The code may be stored in a single storage location or may be distributed among multiple data stores. Also, the computer code may use the Expect language or other language similar to Expect. In one embodiment, the input values may be divided into a set of entries, wherein each entry includes one function and its attendant parameters. In this embodiment, the entries are selected in a given order, the code controlling the operations of the functions is accessed and the parameters are passed out amongst this code to generate the executable script.

At a step 108, the method 100 uses the computer code to perform the desired interactions. In one embodiment, the method 100 generates a schedule of interactions with the host computer and executes portions of the code in accordance with this schedule. The schedule may be dictated by the ordering of the input data or by the design of the host computer's interface. A generic controller script may also be executed at the step 108 to monitor outputs of the interaction and to create log files. Accordingly, the method 100 may automate interactions with a host computer and eliminate the need for user intervention.

Figure 2:
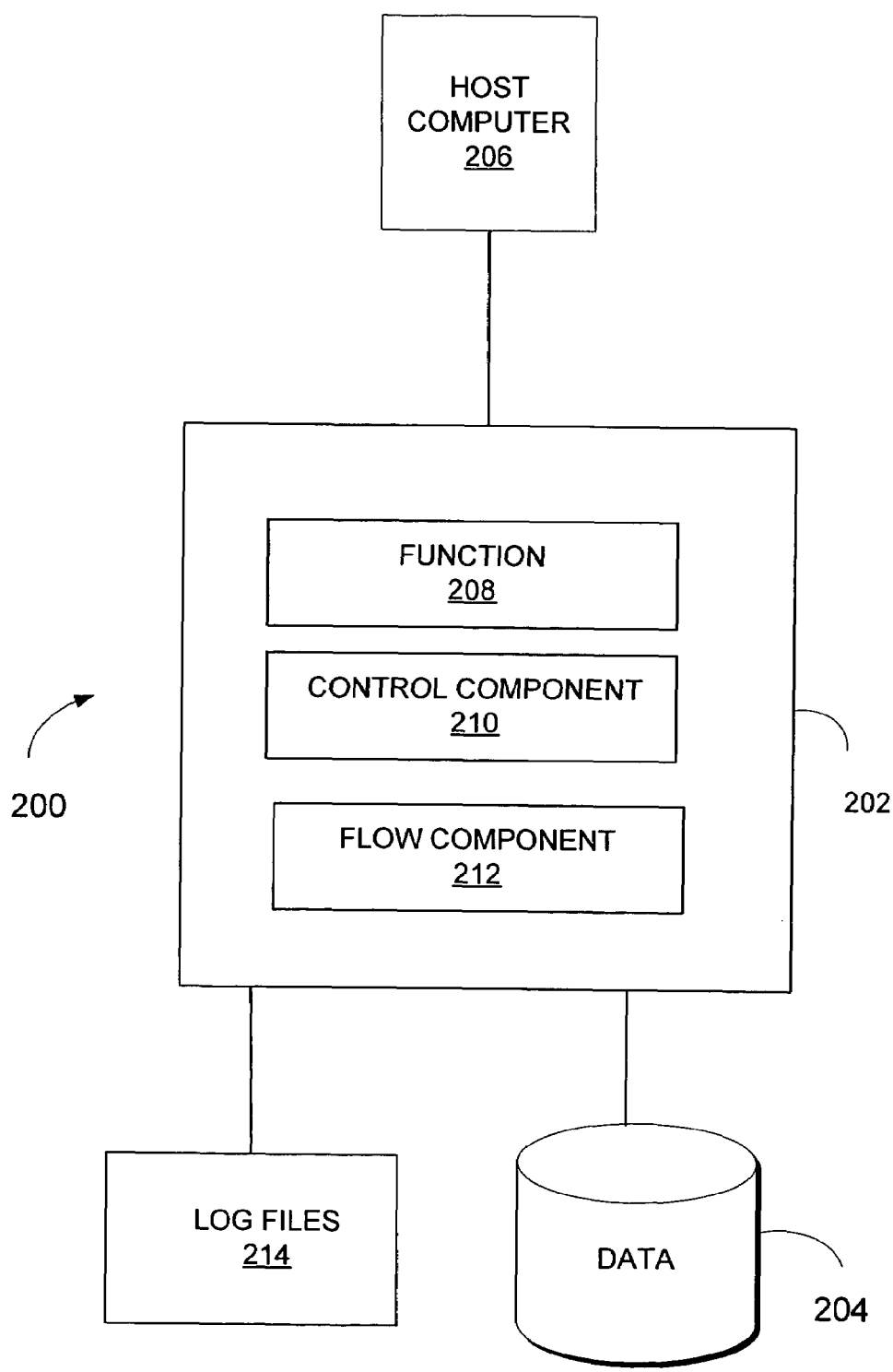
FIG. 2 is a schematic diagram representing a system in accordance with the present invention for automating communications with an interactive program on a host computer.

FIG. 2 illustrates a system 200 for automating communications with an interactive program on a host computer 206. The system 200 includes an interaction engine 202. The interaction engine 202 may be configured to receive input information defining a series of desired interactions. The input information may be received in a variety of different manners and from sources such as a file or a data store 204. In one embodiment, the host computer 206 may run a program with an interactive interface that supplies input prompts and expect responses from a user. When the interface's pattern of prompts is understood, the user may create input information describing a series of desired interactions with the host computer. Then, using this input information, the interaction engine 202 may initiate a connection with the host computer 206 and perform the series of desired interactions in an automated fashion.

The interaction engine 202 includes a library of functions 208, and the functions may be used to perform the desired interactions. As previously mentioned, a function may group together a set of commonly associated or performed tasked. Accordingly, these groupings of tasks may be described in the input information by listing the name of the function and any necessary parameters. As an example, the library of functions 208 may include a function named "runMultiConfirm." This function may be used to run a command on a remote machine that requires multiple confirmations. For example, the input information may include the following input: runMultiConfirm "mput *, ?, y". This input may indicate that a command named "mput *" should be executed and that a question mark (?) should be expected as a confirmation. The input further indicates that a response of yes (y) should be sent for multiple confirmations. So, one call to the function runMultiConfirm is descriptive of this entire series of interactions. To execute these interactions, the code associated with the runMultiConfirm function may be passed the various input parameters and executed. In addition to functions that control interactions with programs, a variety of utility functions may be included in the library of functions 208. These utility functions may perform machine specific functions such as opening or writing to a file.

The system 200 also includes a control component 210. The control component 210 may perform initiation operations and may read all the required input information. The control component 210 may also open connections to the data store 204 and enable log files 214 to log operations. The data store 204 may contain input information and may receive any outputs from the system 200. In one embodiment, the control component 210 divides the input information into a series of steps and schedules the performance of these steps. The operations of one embodiment of the control component 210 are described in greater detail in relation to FIGS. 3A and 3B.

The system 200 also includes a flow component 212 configured to enable execution of computer code associated with the functions identified in the input information. In operation, the flow component 212 may receive the names of user-identified functions and parameters. The flow component 212 may access the library of functions 202, call the identified functions and pass the appropriate parameters. In this manner, the flow component 212 may enable execution of computer code associated with the identified functions and, thus, instigate the automated interaction with the host computer as set forth in the input information.

Figure 3A:
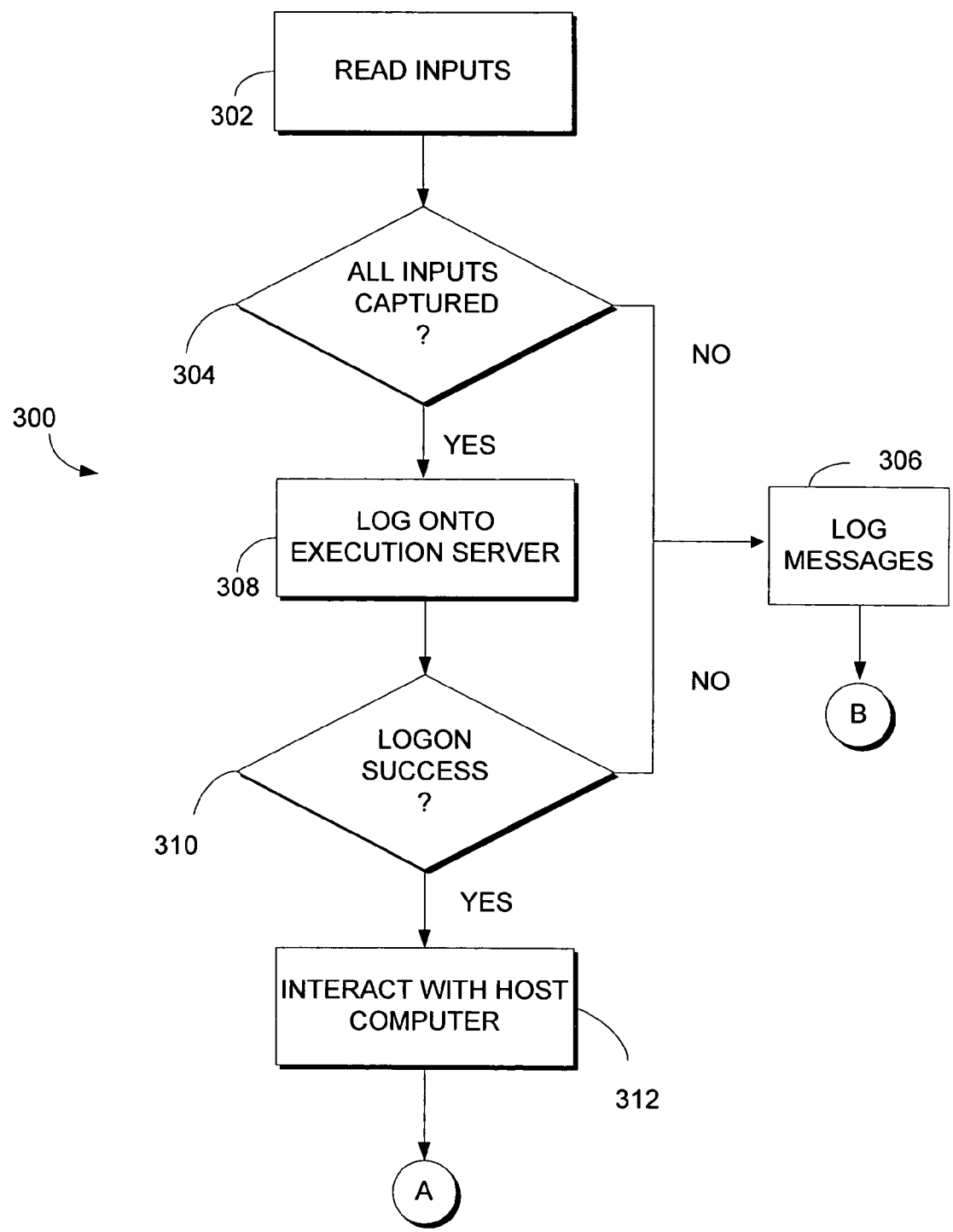
FIGS. 3A and 3B illustrate a method in accordance with the present invention for controlling a system that interacts with a host computer in an automated fashion.
Figure 3B:
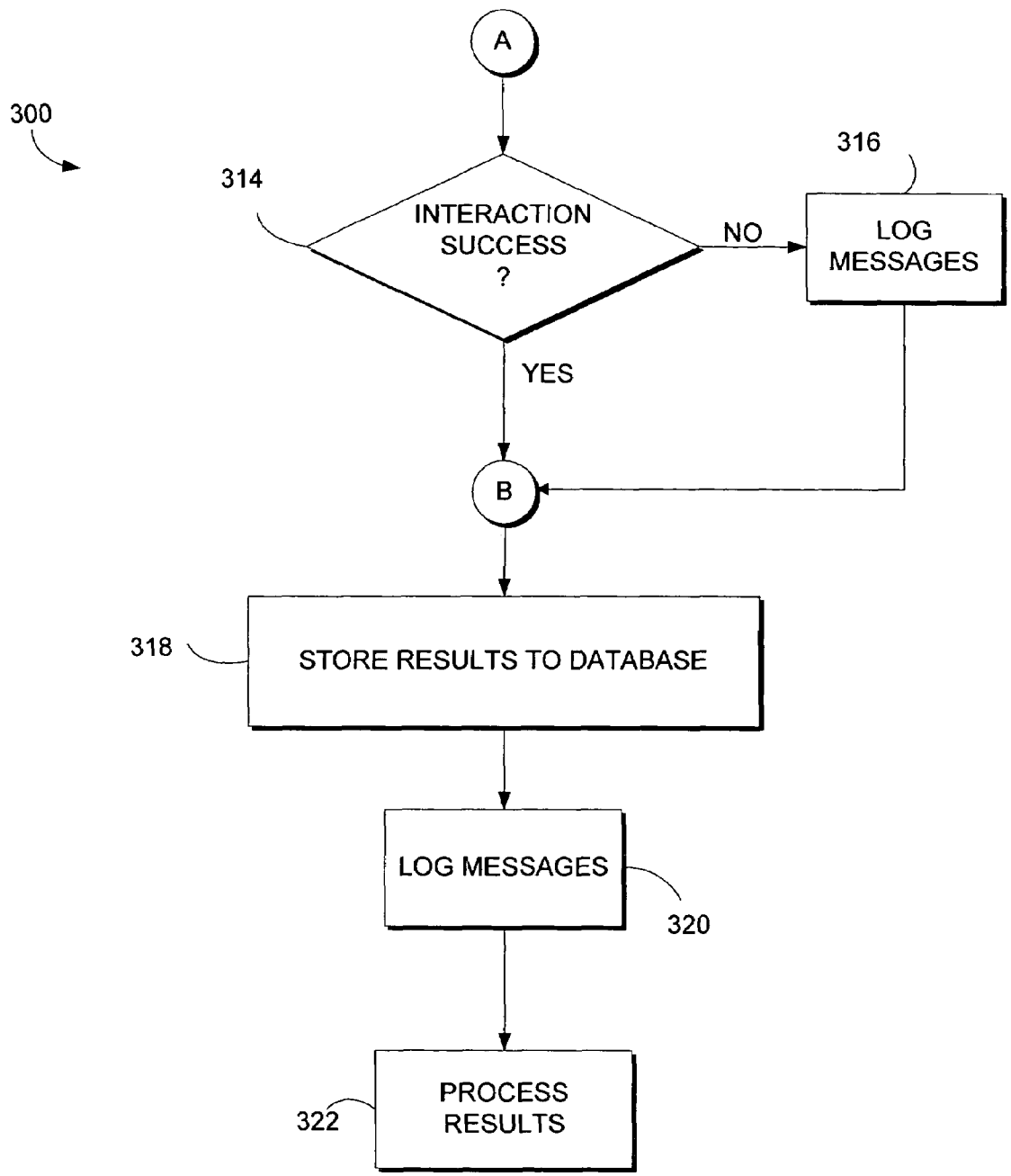

FIGS. 3A and 3B illustrate a method 300 for controlling a system that interacts with a host computer in an automated fashion. At a step 302, the method 300 reads inputs describing a desired interaction with a host computer. For example, the input may be a spreadsheet file organized in columns and rows. The first column of ever row may indicate a function, while the remaining columns may list parameters associated with the indicated functions. At a step 304, the method 300 determines whether all the required inputs were captured. For example, one of the functions may require 3 parameters. If only 2 parameters were captured, the method 300 will detect the missing input, will log an error message at a step 306 and will proceed to a step 318.

If all required inputs are present, the method 300 attempts to logon to an execution server at a step 308 and determines whether the logon succeeded at a step 310. The execution server may be any server capable of communicating with the host computer and performing the automated interactions. The execution server may have access to the various functions identified in the input and may have the ability to execute these functions with the indicated parameters. In one embodiment, the execution server executes script defining the automated processes. If the logon to the execution server fails, the method 300 logs an error message at the step 306 and proceeds to the step 318.

If the logon succeeds, the method 300 interacts with the host computer at a step 312. A number of operations may be performed with respect to the host computer. For example, the method 300 may logon to the host computer and perform a list of tasks, such as executing commands or scripts. The method 300 may retrieve information and perform monitoring and logging operations. As previously discussed, interacting with the host computer may rely on execution of computer code/script related to functions specified in the input. Further, these interactions may be attempted in accordance with a schedule controlled by the method 300. At a step 314, the method 300 determines whether the interaction succeeded. If not, the method 300, at a step 316, logs an error message and proceeds to the step 318.

If the interaction loop was successful, the method 300 stores results from the interaction loop in a database at a step 318. In one embodiment, the method 300 logs, line-by-line, the execution of commands into a text file or database. The method 300 logs messages at a step 320, and it may process the results of the interaction at a step 322. Those skilled in the art will recognize that the method 300 may be implemented as part of a controller program used to initiate and log any number of interactions. Such controllers allow any properly formatted input to be read in, executed and logged.

In one embodiment, the inputs may be presented in a file having a series of parsable entries. For example, the inputs may be presented in a spreadsheet or in a table. TABLE 1 presents an input table in accordance with an embodiment of the present invention.

TABLE 1

| Column 1 | Column 2 | Column 3 | Column 4 | Column 5 |
|---|---|---|---|---|
| OpenTelnet | 192.168.1.3 | User1 | Pwd | 1 |
| startCapture | "c:/foo/log/500.txt" | 1 | | |
| runCmd | vt100 | | | |
| runCmd | "cd/home/foo/patch/core" | | | |
| runCmd | pwd | | | |
| runCmd | "ls-lrt" | | | |
| openFTP | 10.77.24.13 | Foo | Foopass2 | 2 |
| runCmd | "quote site lrecl 128" | | | |
| runCmd | Bin | | | |
| runCmd | Ha | | | |
| runMultiConfirm | "input * ? y" | | | |
| closeTelnet | | | | |
| captureStop | | | | |

The series of interactions described in TABLE 1 includes initiating a telnet session and logging a user onto a remote computer having the IP address 192.168.1.3. The startCapture command begins the capturing of screens and the storing of output in a log file named "c:/foo/log/500.txt." A variety of commands are run on the remote machine, and an FTP session is initiated. Additional commands are run, and the function runMultiConfirm confirms performance of commands. Once all commands are run, the FTP and telnet sessions are ended, and the log file capture is suspended. As will be approached by those skilled in the art and as demonstrated by TABLE 1, the function-based approach of the present invention allows for a compact and data-driven representation of this series of interactions.

In accordance with the present invention, the inputs of TABLE 1 may be parsed and divided into a series of steps or function calls. These function calls may be used to generate executable script, and the functions may be called in a given order to achieve the desired interaction. Thus, through use of input formats such as presented in TABLE 1, a user with no scripting knowledge may use the present invention to automate computer interactions.

Figure 4:
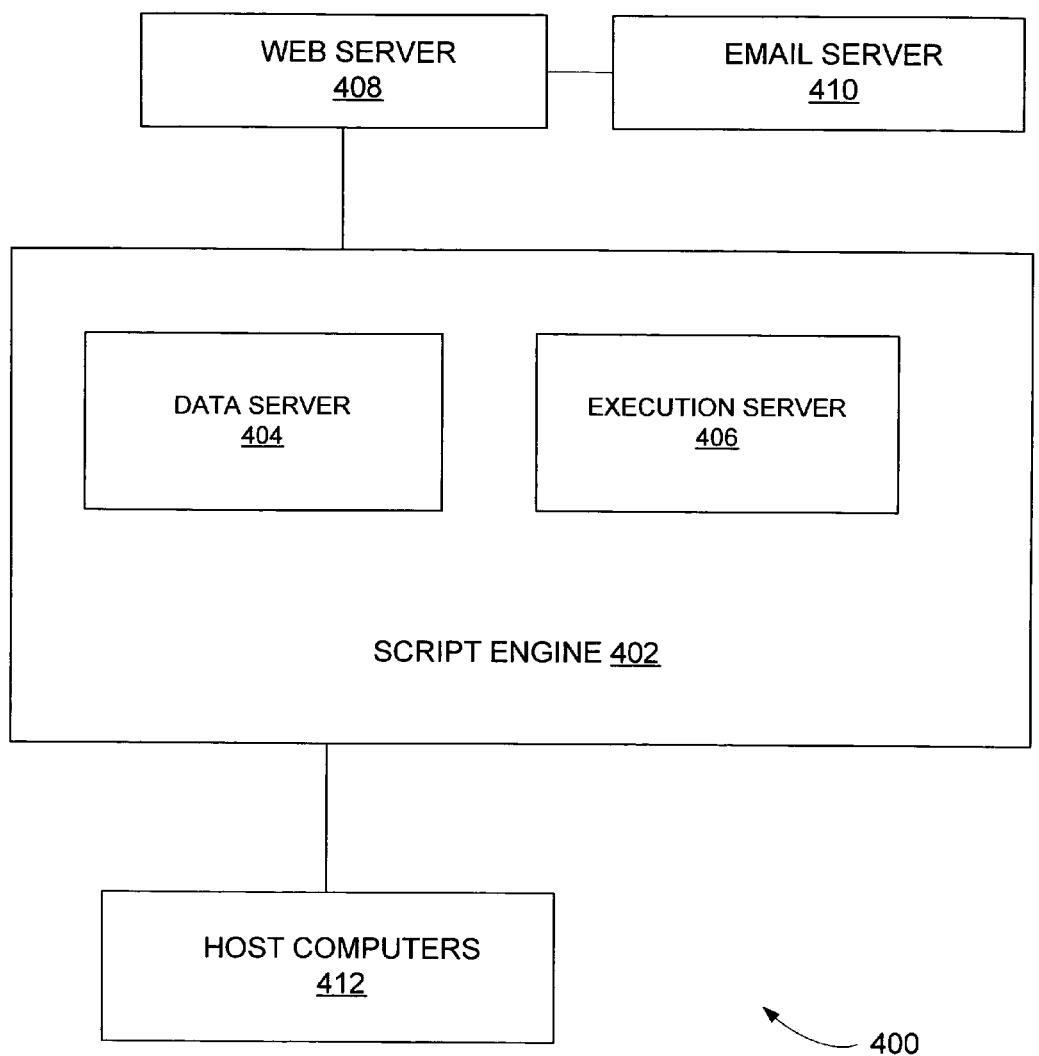
FIG. 4 is a schematic diagram representing a system in accordance with the present invention for interacting with one or more host computers.

FIG. 4 illustrates a system 400 for interacting with one or more host computers. The system 400 includes a script engine 402 that contains a data server 404 and an execution server 406. The data server 404 may be configured to receive any number of inputs describing an interaction with a host computer. For example, the data server 404 may receive a file listing functions and parameters. The data server 404 may also receive computer code, script or other configuration and scheduling information. The inputs may be entered via any number of interfaces. For example, a web server 408 may provide an interface for allowing the input of data. In one embodiment, the inputs may be purely data driven, and the web server 408 may provide an interface with a series of templates for entering this data. The data server 404 may also receive and store any results from the performance of the requested interactions. Results may also be presented to the user via an interface provided by the web server 408. The web server 408 may also be in communication with an email server, which may send results to specified email address.

The execution server 406 may be configured to interact with host computers 412. The execution server 406 may read input data from the data server 404 and utilize this data to generate computer code allowing performance of the desired interactions with the host computers 412. It should be noted that the host computers 412 may include multiple computers which interaction is desired. In one embodiment, the execution server 406 reads the input data and schedules performance of various commands. In accordance with this schedule, the execution server 406 calls necessary functions. Accordingly, the desired interactions with the host computers 412 may occur. The execution server 406 may also perform any number of monitoring and logging operations. As will be appreciated by those skilled in the art, the execution server 406 may supply all of the code necessary to perform the desired interactions and, as this code is modular, it may be efficiently reused for many different interactions.

Alternative embodiments and implementations of the present invention will become apparent to those skilled in the art to which it pertains upon review of the specification, including the drawing figures. Accordingly, the scope of the present invention is defined by the appended claims rather than the foregoing description.

The invention claimed is:

1. One or more computer-readable media having computer-useable instructions embodied thereon to perform a method for automating interaction with one or more host computers, said method comprising:
   receiving a set of input values defining a set of desired interactions with at least one interface on said one or more host computers, wherein said at least one interface includes one or more input prompts;
   generating computer code for performing said set of desired interactions with respect to said at least one interface, wherein said computer code is generated in an automated fashion by a computer that incorporates said set of input values into said computer code; and
   automating interactions with said one or more host computers by executing said computer code, wherein said interactions include responding to at least a portion of said one or more input prompts by ascertaining said set of desired interactions from the computer code.

2. The computer-readable media of claim 1, wherein said set of input values does not include executable instructions.

3. The computer-readable media of claim 1, wherein said method further comprises receiving at least a portion of said set of input values through a web-based interface.

4. The computer-readable media of claim 1, wherein said method further comprises compiling at least one output log that includes results from said interacting.

5. The computer-readable media of claim 4, wherein said method further comprises emailing said at least one output log to one or more email addresses.

6. The computer-readable media of claim 1, wherein said set of input values includes one or more references to one or more functions for controlling interactions with said host computer.

7. The computer-readable media of claim 6, wherein said one or more references includes one or more parameters associated with one of said one or more functions.

8. The computer-readable media of claim 1, wherein said computer code includes commands for imitating human interaction with said at least one interface.

9. The computer-readable media of claim 1, wherein at least a portion said computer code is written in the Expect computer language or in a computer language derived from the Expect computer language.

10. A system for automating communications with an interactive program on a host computer, said system comprising:
- a plurality of functions for controlling interactions with said interactive program, wherein at least a portion said plurality of functions include a sequence of one or more responses to one or more input prompts by said interactive program;
- a control component configured to receive a set of input values defining a series of desired interactions with said host computer, wherein said set of input values identifies at least a portion of said plurality of functions; and
- a flow component configured to automate performance of said series of desired interactions by executing computer code associated with at least a portion of the functions identified in said set of input values, wherein said computer code is generated in an automated fashion by a computer that incorporates said set of input values into said computer code.

11. The system of claim 10, further comprising one or more data stores containing at least a portion of said set of input values or configured to receive results obtained from performance of said series of desired interactions.

12. The system of claim 11, wherein at least a portion of said one or more data stores are operable for sending or receiving information over the Internet or over email.

13. The system of claim 10, wherein said control component is further configured to initiate communications with said host computer.

14. The system of claim 10, wherein said plurality of functions includes one or more utility scripts for handling device specific functions.

15. The system of claim 10, wherein said set of input values is received in a file containing identified functions and one or more parameters associated with at least a portion of said identified functions.

16. The system of claim 10, further comprising a parser configured to convert said set of input values into a set of function calls defining said series of desired interactions.

17. One or more computer-readable media having computer-useable instructions embodied thereon to perform a method for automating interaction with a host computer, said method comprising:
- providing a plurality of functions for controlling one or more interactions with said host computer, wherein at least a portion of said plurality of functions require one or more parameters associated with at least one of said one or more interactions;
- receiving a set of input values defining a series of desired interactions with said host computer, wherein said set of input values identifies at least a portion of said plurality of functions;
- generating computer code for performing said series of desired interactions, wherein said computer code is generated in an automated fashion by a computer that incorporates said set of input values into said computer code; and
- automating performance of said series of desired interactions by executing said computer code associated with at least a portion of said plurality of functions.

18. The computer-readable media of claim 17, wherein at least a portion of said plurality of functions define a set of interactions with an interactive program on said host computer.

19. The computer-readable media of claim 18, wherein said interactive program includes an interface having a series of input prompts requiring at least one response.

20. The computer-readable media of claim 19, wherein said series of desired interactions is designed to correspond with said series of input prompts.

* * * * *